3,326,917
DECAHYDROACRIDINES
Louis R. Freimiller, Philadelphia, and Joseph W. Nemec, Rydal, Pa., assignors to Rohm & Haas Company, Philadelphia, Pa., a corporation of Delaware
No Drawing. Filed Mar. 2, 1964, Ser. No. 348,761
10 Claims. (Cl. 260—279)

This invention deals with specific decahydroacridines as new compositions of matter. It further deals with a method for producing these specific decahydroacridines.

The N-substituted 1,2,3,4,5,6,7,8,9,10-decahydroacridines of this invention are represented by the formula

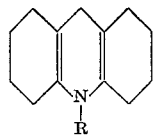

wherein R contains up to 18 carbon atoms and is represented by alkyl, cyclohexyl, alkyl-substituted cyclohexyl, phenyl, alkyl-substituted phenyl, benzyl and alkyl-substituted benzyl. The cyclohexyl and phenyl rings may contain more than one alkyl substituent as long as the carbon total is observed. Also, the decahydroacridine nucleus itself may contain an inert substituent, such as a lower alkyl group.

The compounds of the present invention are prepared by reacting methylene-bis-2,2'-cyclohexanone with an amine having the formula

RNH$_2$ wherein R has the significance previously set forth. The reaction involves a clean cut condensation which leads to the formation of the defined N-substituted 1,2,3,4,5,6,7,8,9,10-decahydroacridines and the liberation of water.

The amines employed may typically include methylamine, ethylamine, butylamine, octylamine, dodecylamine, octadecylamine, cyclohexylamine, methylcyclohexylamine, dibutylcyclohexylamine, aniline, methylaniline, diethylaniline, benzylamine, diethylbenzylamine and dipentylbenzylamine.

The reaction is substantially equimolecular with respect to the ketone and the amine, but it is generally desirable to employ an excess of amine in order to assure highest yields.

The reaction is conducted in a temperature range of about 100° to 160° C., preferably 140° to 160° C. The reaction may be conducted at atmospheric pressure, but in the case of the more volatile amines, it is preferable to conduct the reaction in an autoclave or other laboratory bomb. The reaction is then satisfactorily conducted employing autogenous pressure.

While a solvent is not necessary, it is sometimes preferred to employ an inert, organic, volatile solvent, such as aromatic and aliphatic hydrocarbons and alcohols. Suitable in this respect are hexane, octane, benzene, toluene, xylene, ethanol, butanol and the like.

At the conclusion of the reaction, excess amine and evolved water are removed by stripping and also any solvent, if such were employed. The product remains as the residue and may be distilled for purposes of purification. Generally, the product will crystallize slowly upon standing. The products range from clear yellow liquids to yellow to red crystalline solids. They tend to be sensitive to the presence of oxygen.

The products are useful as fungicides, particularly when applied according to normal techniques in the usual amounts against *Stemphylium sarcinaeforme*, *Alternaria solani* and *Sclerotinia fructicola*.

The products of this invention are also useful as herbicides, particularly in post-emergence applications against both mono- and dicotyledonous plants. They consistently yield 60 to 90% control when applied in amounts of 5 to 10 pounds per acre in a conventional agriculturally acceptable carrier. These compounds are particularly effective against millet, wild oats, crabgrass, ryegrass, foxtail, among the monocotyledonous plants and against mallow, curly dock, mustard, lamb's-quarter, pigweed and wild carrot, among the dicotyledonous plants.

The present invention may be fully understood from the following examples which are offered by way of illustration and not by way of limitation. Parts by weight are used throughout.

*Example 1*

To a Parr two-liter stirring autoclave is charged 104 parts (0.5 mole) of methylene-bis-2,2'-cyclohexanone, 93 parts (3 moles) of methylamine and 200 parts of toluene. The mixture is then stirred and heated to 150° to 160° C. for five hours. The maximum pressure reached is 320 p.s.i.g. After cooling and removing the contents from the autoclave, the excess amine is stripped off, followed by water and toluene. The residual product is then distilled at 106° to 138° C. at .07 to .26 mm. of mercury.

The product, $C_{14}H_{21}N$, contains 82.47% carbon (theoretical 82.68%), 10.46% hydrogen (theoretical 10.43%) and 6.98% nitrogen (theoretical 6.89%). The product is identified as N-methyl-1,2,3,4,5,6,7,8,9,10-decahydroacridine and is obtained in a yield of 94.4%.

*Example 2*

A mixture of 104 parts (0.5 mole) of methylene-bis-2,2'-cyclohexanone, 43.8 parts (0.5 mole plus 20% excess) of n-butylamine and 100 parts of toluene is charged to a Parr one liter stirring autoclave. This is stirred and heated to 100° to 106° C. for seven hours, then cooled and emptied from the autoclave. The excess butylamine, water and toluene are stripped off under reduced pressure and the residue is distilled at 118° to 132° C. at .09 to .12 mm. of mercury.

The product, $C_{17}H_{27}N$, contains 82.93% carbon (theoretical 83.18%), 11.09% hydrogen (theoretical 11.11%) and 5.99% nitrogen (theoretical 5.71%). The product is identified as N-(1-n-butyl)-1,2,3,4,5,6,7,8,9,10-decahydroacridine and is obtained in a yield of 85.8%.

In a similar way, there is prepared N-dodecyl-1,2,3,4,5,6,7,8,9,10-decahydroacridine by reacting methylene-bis-2,2'-cyclohexanone with dodecylamine.

*Example 3*

A mixture of 104 parts (0.5 mole) of methylene-bis-2,2'-cyclohexanone, 109 parts (1.1 moles) of cyclohexylamine and 250 parts of methanol is heated at 150° to 160° C. for five hours. After removal of lower boiling materials, approximately 81 parts (60% yield) of N-cyclohexyl-1,2,3,4,5,6,7,8,9,10-decahydroacridine is isolated by vacuum distillation (boiling point 140° C. at .04 mm.). The product crystallizes slowly upon standing.

The product, $C_{19}H_{29}N$, contains 84.02% carbon (theoretical 84.06%), 10.77% hydrogen (theoretical 10.79%) and 5.05% nitrogen (theoretical 5.16%).

In a similar way, there is prepared N-benzyl-1,2,3,4,5,6,7,8,9,10-decahydroacridine by reacting methylene-bis-2,2'-cyclohexanone with benzylamine.

*Example 4*

A mixture of 104 parts (0.5 mole) of methylene-bis-2,2'-cyclohexanone, 93 parts (1 mole) of aniline and 100 parts of xylene is refluxed into a Stark-Dean trap for about five hours until no more water is obtained (17 to 18 parts are separated—theoretical 18 parts). The residue is cooled and stripped of xylene and excess aniline. There is then distilled 132 parts (quantitative yield) of N-phenyl-1,2,3,4,5,6,7,8,9,10-decahydroacridine (boiling point 160° to 165° C. at .07 mm.). The product crystallizes slowly upon standing.

The product, $C_{19}H_{23}N$, contains 86.04% carbon (theoretical 85.97%), 8.78% hydrogen (theoretical 8.75%) and 5.25% nitrogen (theoretical 5.23%).

In a similar way, there is prepared N-octylphenyl-1,2,3,4,5,6,7,8,9,10-decahydroacridine by reacting methylene-bis-2,2'-cyclohexanone with octylaniline.

We claim:
1. A composition having the formula

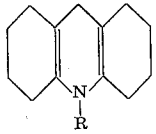

in which R contains up to 18 carbon atoms and is a member selected from the group consisting of alkyl, cyclohexyl, alkyl-substituted cyclohexyl, phenyl, alkyl-substituted phenyl, benzyl and alkyl-substituted benzyl.

2. A composition according to claim 1 wherein R represents alkyl.
3. A composition according to claim 1 wherein R represents phenyl.
4. A composition according to claim 1 wherein R represents benzyl.
5. A composition according to claim 1 wherein R represents cyclohexyl.
6. A composition according to claim 1 wherein R represents methyl.
7. A composition according to claim 1 wherein R represents butyl.
8. A method for the preparation of a compound having the formula

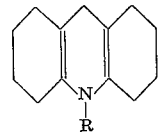

in which R contains up to 18 carbon atoms and is a member selected from the group consisting of alkyl, cyclohexyl, alkyl-substituted cyclohexyl, phenyl, alkyl-substituted phenyl, benzyl and alkyl-substituted benzyl comprising condensing methylene-2,2'-cyclohexanone and a compound having the formula $RNH_2$.

9. A method according to claim 8 in which the reaction is conducted in the temperature range of about 100° C. to 160° C.
10. A method according to claim 8 in which the reaction is conducted in the temperature range of about 140° C. to 160° C. in the presence of an inert volatile organic solvent.

No references cited.

ALEX MAZEL, *Primary Examiner.*

DONALD G. DAUS, *Assistant Examiner.*